(12) United States Patent
Yoo

(10) Patent No.: US 8,132,175 B2
(45) Date of Patent: Mar. 6, 2012

(54) MOBILE TELECOMMUNICATION HANDSET CAPABLE OF IMPLEMENTING MULTITASKING AND METHOD FOR IMPLEMENTING MULTITASKING IN A MOBILE TELECOMMUNICATION HANDSET

(75) Inventor: Jun-Hyun Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 1491 days.

(21) Appl. No.: 11/557,624

(22) Filed: Nov. 8, 2006

(65) Prior Publication Data

US 2007/0106991 A1      May 10, 2007

(30) Foreign Application Priority Data

Nov. 8, 2005   (KR) .................. 10-2005-0106679

(51) Int. Cl.
*G06F 9/46* (2006.01)
*H04M 3/00* (2006.01)

(52) U.S. Cl. ......... 718/103; 718/104; 718/108; 455/418

(58) Field of Classification Search .................. None
See application file for complete search history.

(56) References Cited

U.S. PATENT DOCUMENTS

| 5,572,573 | A  | * | 11/1996 | Sylvan et al. | ............. 455/556.2 |
| 7,315,904 | B2 | * | 1/2008  | Geib et al.   | .................... 710/5 |
| 7,334,228 | B2 | * | 2/2008  | Clohessy et al. | ............. 718/104 |

* cited by examiner

*Primary Examiner* — Camquy Truong
(74) *Attorney, Agent, or Firm* — Lee, Hong, Degerman, Kang & Waimey

(57) ABSTRACT

A mobile telecommunication handset capable of implementing multitasking and a method for implementing multitasking in a mobile telecommunication are provided that makes it possible to implement multitasking even if sufficient memory and resources are not available. The mobile telecommunication handset includes a keypad having multitasking-specific function keys, a memory storing a task to run in a multitasking mode and task information related to the multitasking mode, a control unit controlling functions to implement a current task based on the task information, and a display unit displaying on-screen information related to multitasking in a multi tasking mode.

9 Claims, 2 Drawing Sheets

| TASK | NECESSARY MEMORY | HIGH PRIORITY ORDER |
|------|------------------|---------------------|
| A | 4 | 3 |
| B | 8 | 1 |
| C | 2 | 2 |
| D | 6 | 2 |
| E | 9 | 4 |

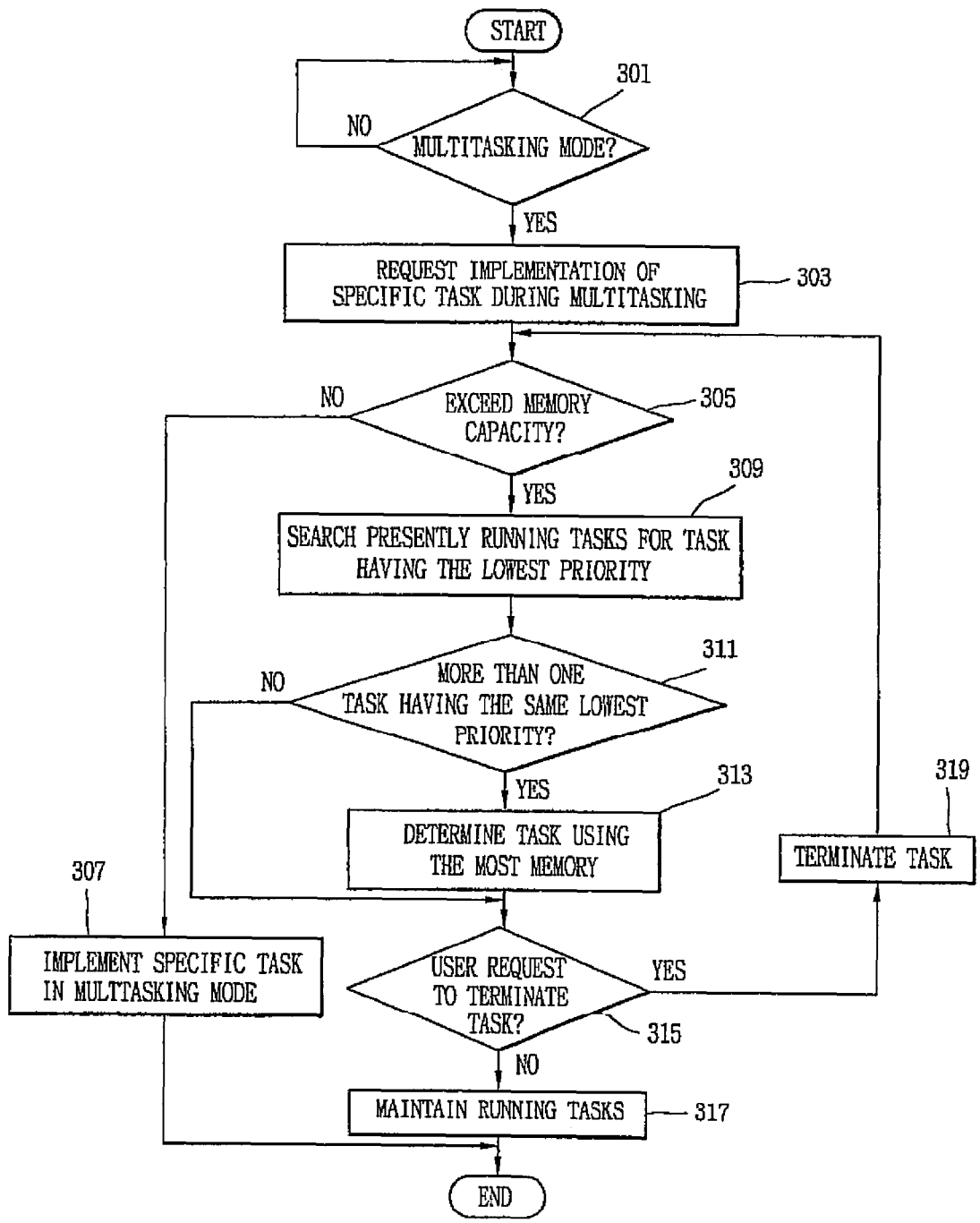

MOBILE TELECOMMUNICATION HANDSET CAPABLE OF IMPLEMENTING MULTITASKING AND METHOD FOR IMPLEMENTING MULTITASKING IN A MOBILE TELECOMMUNICATION HANDSET

CROSS-REFERENCE TO RELATED APPLICATIONS

Pursuant to 35 U.S.C. §119(a), this application claims the benefit of earlier filing date and fight of priority to Korean Application No. 10-2005-0106679, filed on Nov. 8, 2005, the contents of which is hereby incorporated by reference herein in its entirety.

FIELD OF THE INVENTION

The present invention relates to a mobile telecommunication handset, and more particularly to a mobile telecommunication handset capable of implementing multitasking and a method for implementing multitasking in a mobile telecommunication handset.

DESCRIPTION OF THE RELATED ART

A stand-alone application or a subprogram that is run as an independent entity is known as a task that serves as a basic unit controlled by an operating system (OS). Most current operating systems support multitasking by which multiple tasks are implemented at the same time.

The implementation of multiple tasks depends on memory capacity of the mobile telecommunication handset. The availability of memory or resources for multitasking makes it possible to additionally implement a specified task in a multitasking environment.

A conventional mobile telecommunication handset displays only an alert message that a specified task cannot be implemented when sufficient memory is not available for multitasking, thereby failing to implement the multitasking in the multimedia environment.

SUMMARY OF THE INVENTION

An object of the present invention is to provide a mobile telecommunication handset capable of implementing multitasking and a method for implementing multitasking in a mobile telecommunication handset even if memory and/or resources are not available for implementing the multitasking in a multimedia environment. Another object of the present invention is to provide a mobile telecommunication handset capable of implementing multitasking and a method for implementing multitasking in a mobile telecommunication handset that allows a current task to take priority over a preceding task in a multitasking mode.

In one aspect of the present invention, a mobile telecommunication handset capable of implementing multitasking is provided. The handset includes a keypad including a plurality of function keys corresponding to a multitasking mode and adapted to receive user input related to performing a plurality of tasks in the multitasking mode, a memory unit adapted to store task information related to the plurality of tasks, a display unit adapted to display on-screen information related to the multitasking mode and a control unit adapted to implement the multitasking mode by selecting at least one currently running task for termination in order to perform a requested one of the plurality of tasks if there is insufficient memory to implement the requested one of the plurality of tasks, the at least one currently running task selected according to the task information.

It is contemplated that the control unit is further adapted to select the at least one currently running task having a lowest priority among a plurality of currently running tasks in order to secure sufficient memory to implement the requested one of the plurality of tasks. It is further contemplated that the control unit is further adapted to select the at least one currently running task that requires the most memory among a plurality of currently running tasks having the same lowest priority.

It is contemplated that the task information includes at least one of an indication of the amount of memory required for performing each of the plurality of tasks and a priority order of each of the plurality of tasks. It is further contemplated that the control unit is further adapted to update the priority order of each of the plurality of tasks according to a number of times each of the plurality of tasks is implemented.

It is contemplated that the control unit is further adapted to one of implement the requested one of the plurality of tasks by terminating the selected at least one currently running task and continue to implement the selected at least one currently running task by not implementing the requested one of the plurality of tasks according to a user input. It is further contemplated that the control unit is further adapted to generate the on-screen information to indicate the selected at least one currently running task.

It is contemplated that the control unit is further adapted to implement the requested one of the plurality of tasks without terminating any currently running task if there is sufficient memory. It is further contemplated that the memory includes a program memory portion and a data memory portion, the program memory portion adapted to store programs for controlling functions of the handset and the task information related to the plurality of tasks and the data memory portion adapted to temporarily store data generated during execution of the programs. Preferably, the mobile telecommunication handset further includes a wireless telecommunication unit adapted to receive and transmit voice and data signals and an audio processing unit adapted to reproduce audio signals via a speaker and receive audio signals via a microphone.

In another aspect of the present invention, a method for implementing multitasking in a mobile telecommunication handset is provided. The method includes determining if sufficient memory exists to implement a requested task in a multitasking mode and selecting at least one currently running task for termination if there is insufficient memory to implement the requested task, the at least one currently running task selected according to stored task information.

It is contemplated that selecting the at least one currently running task includes determining the at least one currently running task having a lowest priority among a plurality currently running tasks in order to secure sufficient memory to implement the requested task. It is further contemplated that selecting the at least one currently running task further includes selecting the at least currently running task that requires the most memory from among a plurality of currently running tasks having the same lowest priority.

It is contemplated that the stored task information includes at least one of an indication of the amount of memory required for performing each of a plurality of tasks and a priority order of each of the plurality of tasks. It is further contemplated that the method further includes updating the priority order of each of the plurality of tasks according to a number of times each of the plurality of tasks is implemented.

It is contemplated that the method further includes one of implementing the requested task by terminating the selected at least one currently running task and continuing to implement the selected at least one currently running task by not implementing the requested task according to a user input. It is further contemplated that the method further includes generating on-screen display information to indicate the selected at least one currently running task. Preferably, the method further includes implementing the requested task without terminating any currently running task if there is sufficient memory.

In another aspect of the present invention, a method for implementing multitasking in a mobile telecommunication handset is provided. The method includes storing task information related to performing a plurality of tasks in a multitasking mode, receiving user input requesting implementation one of the plurality of tasks while at least one other of the plurality of tasks is currently running, determining if sufficient memory exists to implement the requested one of the plurality of tasks in the multitasking mode, selecting at least one currently running task for termination if there is insufficient memory to implement the requested one of the plurality of tasks, the at least one currently running task selected according to the stored task information by determining the at least one currently running task having a lowest priority in order to secure sufficient memory to implement the requested one of the plurality of tasks and one of implementing the requested one of the plurality of tasks by terminating the selected at least one currently running task and continuing to implement the selected at least one currently running task by not implementing the requested one of the plurality of tasks according to a user input. It is contemplated that selecting the at least one currently running task further includes selecting the at least currently running task that requires the most memory from among a plurality of currently running tasks having the same lowest priority.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 3 is a flow chart illustrating a method for implementing multitasking in a mobile telecommunication handset according to the present invention.

DETAILED DESCRIPTION OF THE PREFERRED EMBODIMENTS

Figures 1, 2:
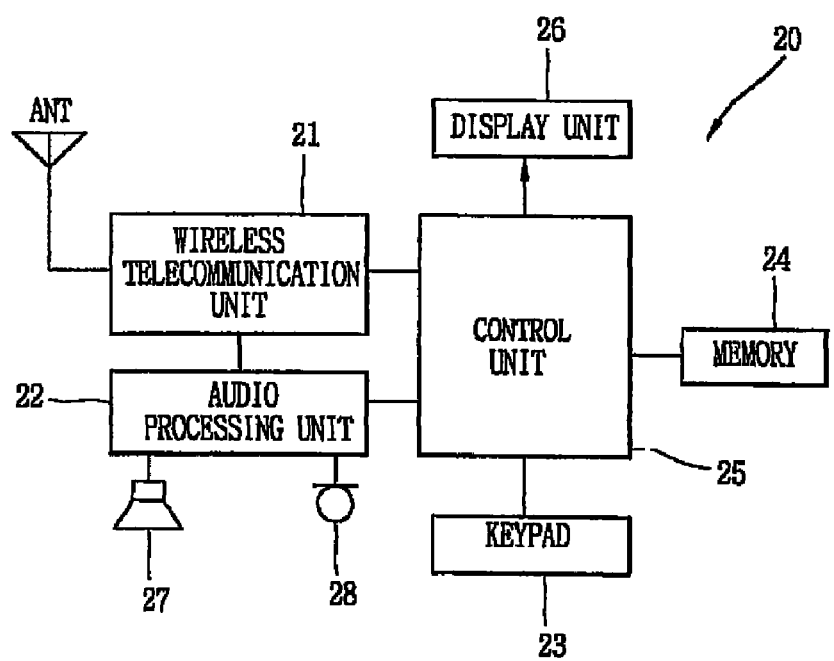
FIG. 1 illustrates task information including a name, necessary memory and priority order.
FIG. 2 is a schematic drawing illustrating the internal configuration of an embodiment of a mobile telecommunication handset according to the present invention.

Reference will now be made in detail to the preferred embodiments of the present invention, examples of which are illustrated in the accompanying drawings. A specific value indicating priority is assigned to each of a plurality of tasks. A presently running task is terminated depending on a priority order of each of the tasks and memory information related to implementing the current task when there is insufficient memory available to implement a current task, thereby facilitating multitasking in a multitasking environment of a mobile telecommunication handset.

FIG. 1 illustrates task information. The task Information includes a name, necessary memory and priority order of each of the tasks. Additional information may be provided. Referring to FIG. 1, assume that the memory capacity of the mobile telecommunication handset is 20 MB and tasks "A", "B", "C", and "D" were implemented in order from left to right, starting with task "A". As illustrated in FIG. 1, task "A" uses 4 MB, task "B" uses 8 MB, task "C" uses 2 MB, and task "D" uses 6 MB, respectively. Therefore, a total of 20 MB is used, which does not exceed the memory capacity.

If implementation of task "E" is requested in addition to tasks "A", "B", "C", and "D", however, additional memory in excess of the available memory capacity of the mobile telecommunication handset is required. Therefore, the task having the lowest priority must be terminated in order to secure memory necessary for implementing task "E."

Accordingly, task "B", having the lowest priority, is terminated in order to secure the memory necessary for implementing task "E". As a result, the total memory in use is 12 MB or the sum of the memory used by task "A", task "B" and task "C". However, despite the termination of task B, the additional 8 MB now available for use is still not enough to implement task "E", which requires 9 MB.

Accordingly, another task having the lowest priority in addition to task "B" must be terminated. At this point, if two tasks have the same lowest priority, the task that uses more memory is terminated. Therefore, task "D", rather than task "C", is terminated since task "D" uses more memory than task "C", even though tasks "C" and "D" are identical in the priority order.

As a result, 6 MB of memory is being used after terminating tasks "B" and "D". The 14 MB now available for use is enough to implement task "E", which requires 9 MB. Therefore, tasks "A", "C" and "E" can be implemented at the same time, thereby facilitating multitasking in the mobile telecommunication handset.

FIG. 2 is a schematic drawing illustrating the internal configuration of an embodiment of a mobile telecommunication handset 20 according to the present invention. The mobile telecommunication handset 20 includes a wireless telecommunication unit 21, an audio processing unit 22, a keypad 23, a memory 24, a control unit 25, a display unit 26, a speaker 22, and a microphone 28.

The wireless telecommunication unit 21 illustrated in FIG. 2 processes received and transmitted voice and data signals. The wireless telecommunication unit 21 includes an RF transmitter performing an ascent transform of the frequency of signals for transmission and amplifying transmitted frequencies, an RF receiver amplifying the received signals almost noiselessly and performing a descent transform of the frequency a codec encoding and modulating the signals for transmission and decoding and demodulating the received signals. The codec includes a data codec processing packet data and an audio codec processing audio signals.

The audio processing unit 22 reproduces the audio signals output from the wireless telecommunication unit 21 and outputs the reproduced audio signals to the speaker 27 or sends audio signals generated from the microphone 28 to the wireless telecommunication unit. The auto processing unit 22 reproduces audio signals including an alarm sound, which are generated in the multitasking mode, and outputs the audio signals to the speaker 27.

The keypad 23 includes keys, which convey information from a user to the mobile telecommunication handset 20, and function keys, which perform specific functions with one-touch of a key. The keypad 23 includes a plurality of function keys that can be used in the multitasking mode.

The memory 24 includes a program memory and a data memory. The program memory stores programs for controlling functions of the mobile telecommunication handset, tasks to run in the multitasking mode and task information in the multitasking mode. The data memory temporarily stores data generated during the executing of the programs.

The task Information includes a name, necessary memory, priority order and additional information related to the each of the tasks illustrated in FIG. 1. The priority order may be updated based on the number of times each of the tasks is performed.

The control unit 25 controls functions including implementing multitasking in the multitasking mode based on the priority order and the memory necessary for each of the tasks included in the task information. The control unit 25 terminates the presently running task having the lowest priority in order to obtain memory necessary for implementing a currently requested task when the requested task cannot be implemented due to lack of memory in the multitasking mode.

When two tasks have the same lowest priority, the control unit 25 terminates the task that uses the most memory. This precludes terminating another task having the same priority, but which uses less memory and thereby does not obtain enough memory to implement the requested task.

The control unit 25 may update the priority orders of the tasks that are included in the task information based on the number of times each of the tasks is implemented. The control unit 25 may terminate or maintain the task having the lowest priority depending on a user's choice.

The display unit 26 displays messages generated during execution of programs under control of the control unit 25. The display unit 26 displays on-screen information related to multitasking in the multitasking mode.

The display unit 26 may include an LCD controller, a memory storing image data, and a liquid crystal display (LCD). The LCD may include a touch-screen LCD. The display unit 26 may also include a combination of the keypad 23 and the touch-screen LCD.

The control unit 25 determines if the multitasking mode is requested via keys. The control unit 25 enters the multitasking mode and implements a task that a user requests if it is within the range of memory capacity when the multitasking mode is requested. On-screen information related to multitasking is displayed on the display unit 26 under control of the control unit 25.

The control unit 25 terminates the presently running task based on the priority order and the memory necessary for each of the tasks that are included in the task information when a requested task cannot be implemented due to lack of memory in the multitasking mode. Consequently, the control unit 25 implements the currently requested task and displays on-screen information related to implementing the requested task on the display unit 26. The control unit 25 also outputs a corresponding audio signal to the speaker through the audio processing unit 22.

FIG. 3 illustrates a method for implementing multitasking in a mobile telecommunication handset according to the present invention. Referring to FIG. 3, the operations illustrated in the flow chart are now described.

A control unit 25 determines if the mobile telecommunication handset is in a multitasking mode (301). When the mobile telecommunication handset is in a multitasking mode, the control unit 25 performs multitasking when a user requests implementation of a specific task (303).

The control unit 25 determines if the sum of the memory necessary to implement the specific task and the total memory used by presently running tasks exceeds the capacity of the memory 24 (305). Not only the memory necessary to implement the specific task is obtained from the task information stored in the memory 24, but also the task order of the specific task.

The control unit 25 implements the specific task in the multitasking mode (307) when the sum does not exceed the capacity of the memory 24. The control unit 25 searches all the presently running tasks for the task having the lowest priority (309) when the sum exceeds the capacity of the memory 24. The control unit 25 then determines if there is more than one presently running task having the same lowest priority (311). When there are two or more running tasks having the same lowest priority, the control unit 25 determines the task using the most memory (313).

The control unit 25 may terminate the task determined as having the lowest priority in order to implement the specific task or maintain the task determined as having the lowest priority without implementing the requested specific task according to a user's choice (315). The control unit 25 displays the name of the task determined as having the lowest priority on the display unit 26 in order to inform the user of the task determined as having the lowest priority.

If the user desires to terminate the task determined as having the lowest priority (315), the control unit 25 terminates the task (319). If the user does not want to terminate the task determined as having the lowest priority (315), the control unit 25 maintains the task having the lowest priority without implementing the specific task (317).

If termination of the task (319) secures the memory necessary for implementing the requested specific task (305), the specific task is implemented (307). However, if termination of the task (319) does not obtain the memory necessary for implementing the specific task, operations 305 to 319 are repeated until the necessary memory is obtained.

According to the present invention, when a requested specific task is not enabled due to limited memory capacity and resources in a multitasking mode, the presently running task is terminated in order of low priority, or in order of high usage of memory if two or more tasks having the same priority exist, in order to obtain the memory necessary to implement the requested specific task, thereby maximizing efficiency in using memory in a multitasking mode without increasing the memory capacity and the resources in the mobile telecommunication handset. Also, an update of task information may be provided according to the number of the times each task is implemented in order to allow a user to enjoy multitasking without experiencing lack of memory in the multitasking environment.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A mobile telecommunication handset capable of implementing multitasking, the handset comprising:
   a keypad comprising a plurality of function keys corresponding to a multitasking mode and adapted to receive user input related to performing a plurality of tasks in the multitasking mode;
   a memory unit adapted to store task information related to the plurality of tasks;
   a display unit adapted to display on-screen information related to the multitasking mode; and
   a control unit adapted to:
      implement the multitasking mode by selecting at least one currently running task for termination in order to perform a requested one of the plurality of tasks if there is insufficient memory to implement the requested one of the plurality of tasks, the at least one currently running task selected according to the task information;
      select for the termination the at least one currently running task having a lowest priority among a plurality of currently running tasks in order to secure sufficient memory to implement the requested one of the plurality of tasks; and
      select for the termination the at least one currently running task that requires the most memory among a plurality of currently running tasks having the same lowest priority;
   wherein the task information comprises at least one of an indication of the amount of memory required for performing each of the plurality of tasks and a priority order of each of the plurality of tasks;
   wherein the control unit is further adapted to update the priority order of each of the plurality of tasks according to a number of times each of the plurality of tasks is implemented;
   wherein the control unit is further adapted to one of implement the requested one of the plurality of tasks by terminating the selected at least one currently running task and continue to implement the selected at least one currently running task by not implementing the requested one of the plurality of tasks according to a user input.

2. The mobile telecommunication handset of claim 1, wherein the control unit is further adapted to generate the on-screen information to indicate the selected at least one currently running task.

3. The mobile telecommunication handset of claim 1, wherein the control unit is further adapted to implement the requested one of the plurality of tasks without terminating any currently running task if there is sufficient memory.

4. The mobile telecommunication handset of claim 1, wherein the memory comprises a program memory portion and a data memory portion, the program memory portion adapted to store programs for controlling functions of the handset and the task information related to the plurality of tasks and the data memory portion adapted to temporarily store data generated during execution of the programs.

5. The mobile telecommunication handset of claim 1, further comprising:
   a wireless telecommunication unit adapted to receive and transmit voice and data signals; and
   an audio processing unit adapted to reproduce audio signals via a speaker and receive audio signals via a microphone.

6. A method for implementing multitasking in a mobile telecommunication handset, the method comprising:
   receiving user input related to performing a plurality of tasks in a multitasking mode:
   storing task information related to the plurality of tasks;
   displaying on-screen information related to the multitasking mode;
   determining if sufficient memory exists to implement a requested task in the multitasking mode; and
   selecting at least one currently running task for termination if there is insufficient memory to implement the requested task, the at least one currently running task selected according to the stored task information;
   wherein the selecting the at least one currently running task for termination comprises determining the at least one currently running task having a lowest priority among a plurality of currently running tasks in order to secure sufficient memory to implement the requested task;
   wherein the selecting the at least one currently running task for termination further comprises selecting the at least one currently running task that requires the most memory from among a plurality of currently running tasks having the same lowest priority;
   wherein the stored task information comprises at least one of an indication of the amount of memory required for performing each of a plurality of tasks and a priority order of each of the plurality of tasks;
   updating the priority order of each of the plurality of tasks according to a number of times each of the plurality of tasks is implemented; and
   one of implementing the requested task by terminating the selected at least one currently running task and continuing to implement the selected at least one currently running task by not implementing the requested task according to a user input.

7. The method of claim 6, further comprising generating on-screen display information to indicate the selected at least one currently running task.

8. The method of claim 6 further comprising implementing the requested task without terminating any currently running task if there is sufficient memory.

9. A method for implementing multitasking in a mobile telecommunication handset, the method comprising:
   storing task information related to performing a plurality of tasks in a multitasking mode;

receiving user input requesting implementation of one of the plurality of tasks while at least one other of the plurality of tasks is currently running;

determining if sufficient memory exists to implement the requested one of the plurality of tasks in the multitasking mode;

selecting at least one currently running task for termination if there is insufficient memory to implement the requested one of the plurality of tasks, the at least one currently running task selected according to the stored task information by determining the at least one currently running task having a lowest priority in order to secure sufficient memory to implement the requested one of the plurality of tasks;

one of implementing the requested one of the plurality of tasks by terminating the selected at least one currently running task and continuing to implement the selected at least one currently running task by not implementing the requested one of the plurality of tasks according to a user input;

wherein the selecting the at least one currently running task further comprises selecting the at least one currently running task that requires the most memory from among a plurality of currently running tasks having the same lowest priority;

wherein the stored task information comprises at least one of an indication of the amount of memory required for performing each of the plurality of tasks and a priority order of each of the plurality of tasks; and updating the priority order of each of the plurality of tasks according to a number of times each of the plurality of tasks is implemented.

* * * * *